(No Model.)

C. M. STEVENSON.
BEADING TOOL.

No. 333,690. Patented Jan. 5, 1886.

a   b

Witnesses

Inventor
Charles M. Stevenson
by J. J. Greenough Atty

UNITED STATES PATENT OFFICE.

CHARLES M. STEVENSON, OF SYRACUSE, NEW YORK.

BEADING-TOOL.

SPECIFICATION forming part of Letters Patent No. 333,690, dated January 5, 1886.

Application filed February 2, 1885. Serial No. 154,761. (No model.)

*To all whom it may concern:*

Be it known that I, CHARLES M. STEVENSON, of the city of Syracuse, county of Onondaga, State of New York, have invented a new and useful Tool or Implement for Cutting Beadings in Wood and other Proper Materials, of which the following is a specification.

My invention consists in the form and construction of a tool or implement to be used as a jig-saw, or with any proper holder, for cutting a bead or beads at one operation, by which greater precision and accuracy is attained than by the processes heretofore in use therefor, with much less labor and cost, and requiring less skill in the working than by any means heretofore adopted with which I am acquainted. I attain these desirable objects by the device illustrated in the accompanying drawing, in which—

Figure 1:
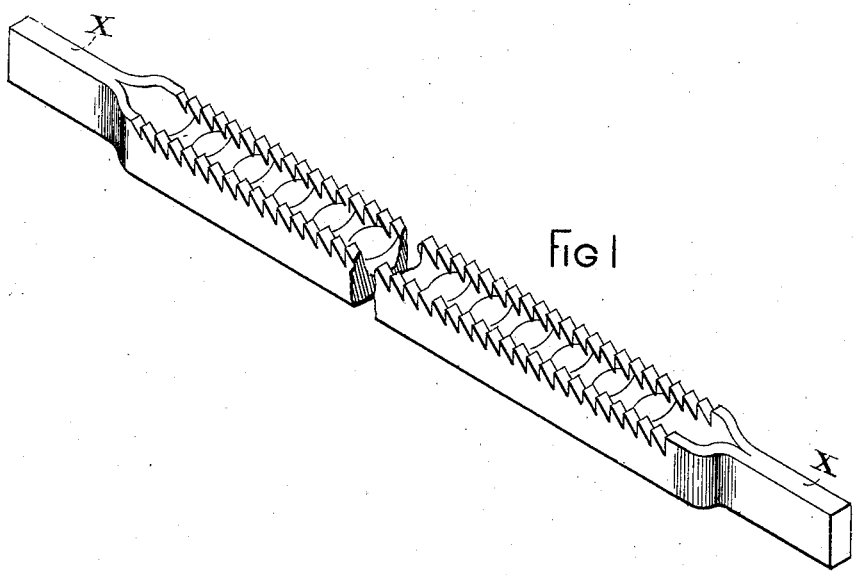
Figure 2:
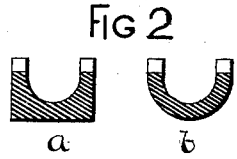
Figure 3:
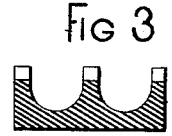

Figure 1 is a perspective view of the cutter. Fig. 2 is a cross-section, $a$, square bar, $b$, curved plate. Fig. 3 is a modification showing a double-bead tool.

In place of the ordinary jig-saw used for forming beading, I employ either a straight rectangular bar of steel, having a groove formed in one of its faces, as seen at Fig. 1, and cross-section $a$, Fig. 2, or a thin strip of steel curved into form in its cross-section, as at $b$, Fig. 2, the groove being made to conform to the outline of the beading. The concave surface of this groove may be cut into a rasping surface with a cold-chisel, or cutting-edges otherwise formed upon or inserted in the surface of said groove, so that when the material is to be cut it shall be formed as the serrated projecting edges enter, and cut a kerf therein into a finished beading, the projecting parallel serrated edges sawing cuts at the proper distance apart to form the bead between them without any laying out or measurement, by which much time and labor are saved, and the greatest accuracy is insured.

A modification of this tool may be made by multiplying the number of grooves, as seen in Fig. 3, by which two or more beads can be cut at the same time, the purpose of the tool being to form a saw-kerf on each side of the bead and round it into the desired form between the cuts at one operation. The ends of this grooved tool are reduced thin at $x$, to be introduced into the frame in place of the ordinary jig-saw without any alteration of the ordinary fastenings now in use.

Having thus described my new and improved tool, I claim and desire to secure by Letters Patent—

1. A solid bar or plate of metal formed with a groove or grooves on one of its longitudinal faces, as described, the projecting edges being serrated with saw-teeth, as described, in combination with a cutting or rasping surface between them to form a bead while cutting the saw-kerfs, substantially as and for the purposes specified.

2. The grooved bar or plate with two or more serrated edges for cutting in the same plane, as described, having its two ends contracted into a thin shank, like a single saw-blade, to be readily inserted into the saw-frame, in the manner and for the purposes described.

CHAS. M. STEVENSON.

Witnesses:
J. J. GREENOUGH,
T. WISNER.